United States Patent
Salamon et al.

(10) Patent No.: US 8,074,003 B1
(45) Date of Patent: Dec. 6, 2011

(54) HOST-BASED STORAGE CONTROLLER PROVIDING BLOCK DEVICES IN GEOGRAPHICALLY DISTRIBUTED STORAGE

(75) Inventors: Victor Salamon, Edmonton (CA); Roel van der Goot, Edmonton (CA)

(73) Assignee: EMC Corporation, Hopkinton, MA (US)

( * ) Notice: Subject to any disclaimer, the term of this patent is extended or adjusted under 35 U.S.C. 154(b) by 178 days.

(21) Appl. No.: 12/647,857

(22) Filed: Dec. 28, 2009

(51) Int. Cl.
*G06F 13/12* (2006.01)
*G06F 13/00* (2006.01)
*G06F 7/04* (2006.01)

(52) U.S. Cl. .................. 710/74; 710/68; 711/100; 726/2
(58) Field of Classification Search .......................... None
See application file for complete search history.

(56) References Cited

U.S. PATENT DOCUMENTS

| | | | | |
|---|---|---|---|---|
| 6,148,414 A | * | 11/2000 | Brown et al. ................... | 714/5.1 |
| 2006/0031450 A1 | | 2/2006 | Unrau et al. | |
| 2006/0107100 A1 | * | 5/2006 | Hayward .......................... | 714/6 |

OTHER PUBLICATIONS

"The Enhanced Network Block Device Linux Kernel Module," last revised Jan. 21, 2010, obtained from http://www.it.uc3m.es/~ptb/nbd/ (Mar. 24, 2010).

"Global File System," obtained from http://en.wikipedia.org/wiki/Global_File_System, printable version (Mar. 24, 2010).
"QFS," obtained from http://en.wikipedia.org/wiki/QFS, printable version (Mar. 24, 2010).
"CFXS," obtained from http://en.wikipedia.org/wiki/CXFS, printable version (Mar. 24, 2010).
"XFS," obtained from http://en.wikipedia.org/wiki/XFS, printable version (Mar. 24, 2010).

* cited by examiner

*Primary Examiner* — Alan Chen
(74) *Attorney, Agent, or Firm* — BainwoodHuang

(57) ABSTRACT

A data processing system is distributed across a plurality of locations coupled together by a wide-area communications network and includes physical storage devices and a set of host computers distributed across the locations. Each host executes both a local initiator application and a local caching storage controller (CSC) application. The CSC applications (1) define a set of block devices presented to the initiator applications for block-oriented data storage operations, the block devices being virtual devices utilizing the underlying physical storage devices, (2) engage in a distributed cache coherence protocol to present the block devices consistently to the initiator applications, (3) in response to a local block storage read command from an initiator application, retrieve the requested data from the local CSC application's cache, from a remote CSC application's cache, or from a physical storage device, and (4) in response to a local block storage write command from an initiator application, invalidate all currently cached user data for the locations/addresses associated with the write command, and either store the user data associated with the write in one or more local or remote CSC application's caches or write the user data to one or more local or remote physical storage devices.

20 Claims, 5 Drawing Sheets

HOST-BASED STORAGE CONTROLLER PROVIDING BLOCK DEVICES IN GEOGRAPHICALLY DISTRIBUTED STORAGE

BACKGROUND

The invention is generally related to the field of data processing systems, and more particularly to data processing systems employing data storage distributed across geographically separated locations.

Distributed storage systems are known in which physical storage resources such as disk drives are distributed across two or more geographically separated locations. Each location includes one or more caching storage controllers connected to the local disk drives, for example by a storage-area network (SAN), and the caching storage controllers of the different locations are connected together by a wide-area communications network. The caching storage controllers are standalone hardware units also having connections to local host computers which utilize the storage resources provided by the caching storage controllers. The connections to the local host computers may also be via a SAN or other storage-oriented interconnect (e.g., Fibrechannel), and typically involve use of a storage-oriented protocol such as SCSI. A storage controller parses SCSI commands received from the separate host computers and performs corresponding storage operations on local and/or remote disk drives.

SUMMARY

While existing distributed storage systems provide desirable functions in a distributed data processing system, they may also suffer from certain drawbacks that can limit their effectiveness. One major aspect of conventional distributed storage systems is the need for one or more dedicated hardware units for the caching storage controllers at each location. Use of dedicated hardware can increase overall system costs. It also entails some degree of organized management or administration, which may be burdensome in certain environments such as a development or testing environment in which it may be desired to frequently change an interface or some aspect of functionality of the caching storage controller. When dedicated hardware is used, it can be difficult and costly to operate in a manner sufficiently dynamic for these kinds of operating environments. The cost factor can create different problems, even in non-dynamic environments if there is cost sensitivity.

A data processing system is disclosed which is distributed across a plurality of locations coupled together by a wide-area communications network and which includes physical storage devices and a set of host computers distributed across the locations. Each host executes both a local initiator application as well as a local caching storage controller (CSC) application. The CSC applications (1) define a set of block devices presented to the initiator applications for block-oriented data storage operations, the block devices being virtual devices utilizing the underlying physical storage devices, (2) engage in a distributed cache coherence protocol to present the block devices consistently to the initiator applications, (3) in response to a local block storage read command from an initiator application, retrieve the requested data from the local CSC application's cache, from a remote CSC application's cache, or from a physical storage device, and (4) in response to a local block storage write command from an initiator application, invalidate all currently cached user data for the locations/addresses associated with the write command, and either store the user data associated with the write in one or more local or remote CSC application's caches or write the user data to one or more local or remote physical storage devices.

It is emphasized that the CSC application is a true storage controller and not a simple presentation of a block of storage. The CSC application may perform some or all of a variety of higher-level storage-related functions beyond block reads and writes. Examples include disk cloning, point-in-time (PIT) copy, slicing and striping, mirroring, virtual storage or "thin provisioning", write order fidelity, data compression and data encryption. More details of these storage-related functions are provided below.

By including the CSC application within the same host computer executing the initiator application(s), overall system cost can be decreased and a measure of flexibility can be obtained which can be useful in dynamic environments of the type discussed above. The CSC application leverages the same hardware used to store and execute the initiator applications, and thus costs are lower than a system using separate dedicated storage controller units. Additionally, the CSC application can be structured so as to be relatively changeable while insulating the changeability and any resulting operating instability from general operation of the hosts, so that development and/or testing can proceed without unduly disrupting operation of the host operating system or other applications. The system may be used in a variety of ways, such as to realize a distributed file system or other shared-data system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
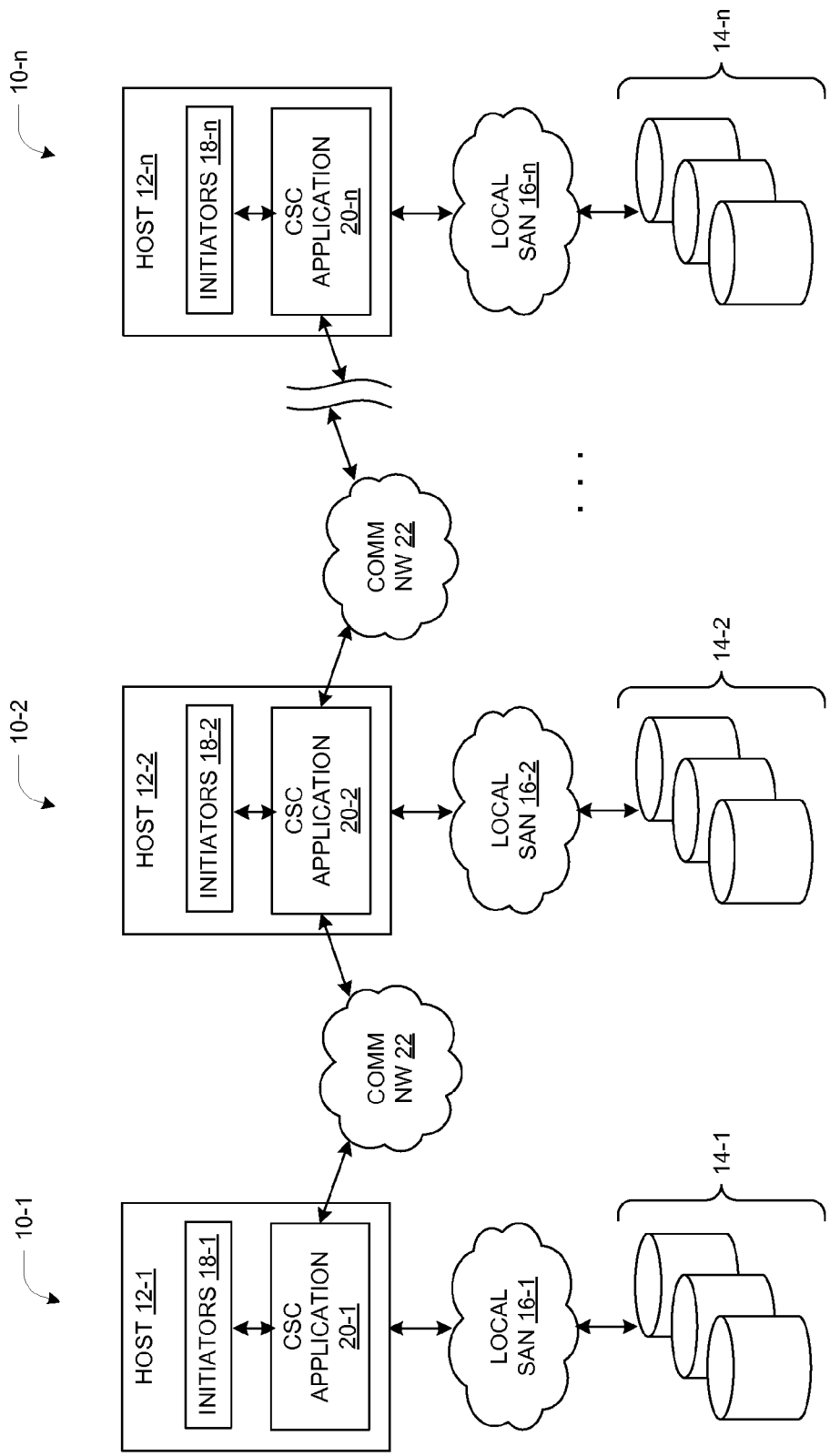
FIG. 1 is a block diagram of a distributed data processing system.

FIG. 1 shows a data processing system distributed across a set of geographically separated locations 10. Each location 10 includes a host computer (HOST) 12 and one or more physical storage devices 14 (such as disk drives) coupled to the host computer 12 by a local storage-area network (SAN) 16. Each host 12 includes one or more initiator applications (INITIATORS) 18 and a host-based caching storage controller (CSC) application 20. The term "initiator" is used to identify the initiator applications 18 as the source of data input/output operations that are directed to blocks of storage. In FIG. 1, both the individual locations 10 and their respective components are further identified using suffixes -1, -2, . . . , -n etc. The hosts 12 of the different locations 10 are coupled together by a wide-area communications network (COMM NW) 22. Although FIG. 1 only depicts communications connections between pairs of hosts 12, in general the communications network 22 may provide connections between each host 12 and two or more of the other hosts 12 of the system. Also, the local SAN 16 and the communications network 22 may be parts of the same network in some embodiments.

The CSC applications 20 of the various hosts 12 operate together to implement a distributed storage system. The CSC applications 20 communicate among themselves to provide any of a set of rich functions to the initiator applications 18, including RAID and other aspects of redundancy. The CSC applications 20 also preferably implement distributed caching of storage data for improved performance, and hence the term "caching." Caching operations includes participation in a distributed cache protocol by which storage data is distributed among the caches of the different CSC applications 20 while providing a consistent, coherent view of the storage data to all the initiator applications 18 of all hosts 12.

As noted, the system of FIG. 1 generally provides distributed storage functionality, mainly by operation of the CSC applications 20 which are co-located with the initiator applications 18 in the hosts 12. The CSC applications 20 are co-operative with each other to define a set of "block devices" and present these to the initiator applications 18 for block-oriented data storage operations, where the block devices are virtual devices relying on the physical storage devices 14 for underlying physical data storage. Each CSC application 20 maintains a cache and engages in a distributed cache coherence protocol by which each block device is presented consistently to the initiator applications 18. In response to a local block storage command from a local initiator application 18, a given CSC application 20 may perform either or both of (1) a local operation to a physical disk via the local SAN 16, and (2) a remote operation to a physical disk at another location 10, which is effected by communicating with the CSC application 20 at the other location 10 and causing it to perform the requested operation on behalf of the requesting CSC application 20. In particular, a requesting CSC application 20 issues an outgoing block storage request to a CSC application 20 of another host 12 via the communications network 22, wherein the outgoing block storage request is directed to a remote one of the physical storage devices 14. At the other end, the receiving CSC application 20 operates in response to such block storage requests received from requesting CSC applications 20 via the communications network 22 to perform a requested block storage operation on a local one of the physical storage devices 14. It will be appreciated that the distributed nature of the system implies that each CSC application 20 acts as both a source of outgoing requests to other CSC applications 20 as well as a receiver of incoming requests from other CSC applications 20.

As mentioned, the CSC application 20 may perform some or all of a variety of higher-level storage-related functions beyond single block reads and writes. A listing of some such functions is provided below, along with a brief description of the processing involved with each function:

a) Cloning

The ability to make a full copy of an existing disk onto a new disk.

b) PIT copy="Point-In-Time" Copy

The ability to make a data snapshot without a full data copy. This is achieved by only copying data blocks that changed after the moment the snapshot was created.

c) Slicing

The ability to split each disk's storage space into units. These units can be recombined into new virtual disks.

d) Striping

Increase data throughput by making use of multiple disks and splitting each operation to multiple disks at the same time.

e) Mirroring

Increase redundancy by adding extra copies of data of a disk to other disk(s)

f) Virtual Storage (Thin Provisioning)

The ability to provision storage on demand while offering the impression that more storage is available than actually present.

g) Write Order Fidelity

The ability to ensure that data is written to disk in the same order as it was written by the collective set of initiator applications.

In case of failures the disk image is consistent with the order in which the application expects to find its data.

h) Compression

The ability to compress and uncompress user data on the fly.

i) Encryption

The ability to encrypt and decrypt user data on the fly.

Additionally, the disclosed technique can be used for relatively efficient configuration operations. For example, in response to a user configuration command from a user interface, a CSC application 20 may perform the configuration change locally and distributedly, by relaying the configuration change to peer CSC applications 20.

Although FIG. 1 shows only a single host 12 per location 10, this is only for ease of description. In general, there may be multiple hosts 12 per location 10. The hosts 12 at a given location may or may not be connected to a shared SAN 16. One deployment that is envisioned is to include CSC applications 20 on respective individual workstations of a distributed workgroup, with the disk(s) of the workstations forming the physical disks 14. In another type of deployment, one or more hosts 12 at a given location may function as a server providing distributed storage services to other co-located hosts 12 which do not include a CSC application 20, such as by a distributed file system or similar mechanism.

Figure 2:
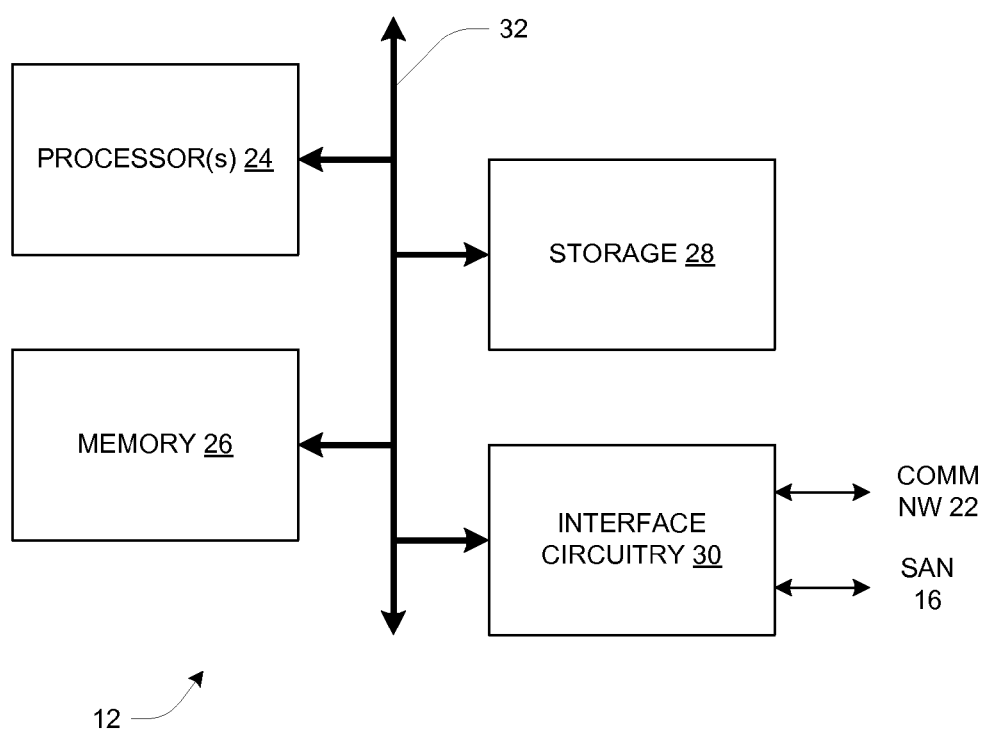
FIG. 2 is a block diagram illustrating hardware processing circuitry of a host computer.

FIG. 2 shows a general hardware configuration for a host 12. Processing circuitry includes one or more processors 24, memory 26, storage 28 and interface circuitry 30 connected together by interconnection circuitry 32. The processor(s) 24, memory 26 and storage 28 operate to store and execute software (computer program instructions) typically including one or more application programs and an operating system (not shown in FIG. 2). More details are given below. The interface circuitry 30 provides connections to the communications network 22 and SAN 16 of FIG. 1 to enable data transfer to and from those networks.

In the present description, the target of storage-related input/output operations is generally described as the storage devices 14 of FIG. 1, which are shown as separate from the hosts 12. It should be noted that the target physical storage devices may include the host-contained storage 28, which may an internal disk drive of the host 12 for example. Such a use of host-contained storage is especially anticipated in the case of deployment on hosts 12 such as personal computers or workstations.

In operation, the data cache maintained by the CSC application(s) 20 is preferably stored in the host's memory 26, although in alternative embodiments the data may be maintained in a separate memory, not shown, which is dedicated to the cache use. Because each CSC application 20 is located within a corresponding host 12, it may be desirable to use the data caching provided by the CSC application 20 to the exclusion of other software-based caching mechanisms such as block caches which are sometimes used by an operating system of a host 12.

Figure 3:
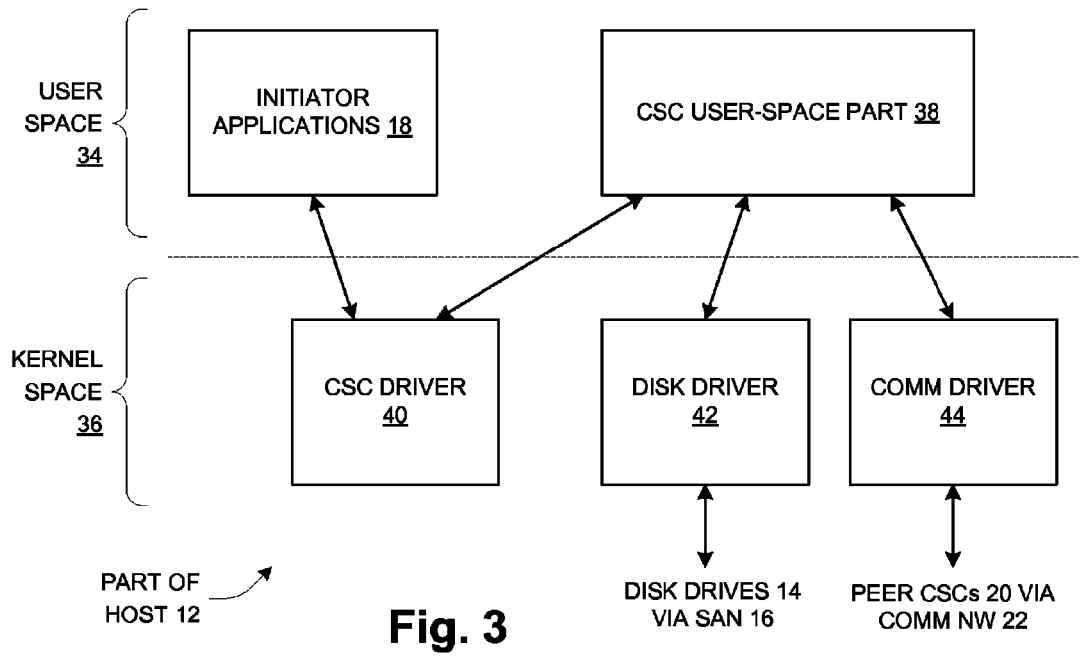
FIGS. 3 and 4 are schematic diagrams showing a structure of software of a host computer according to a first configuration.
Figure 4:
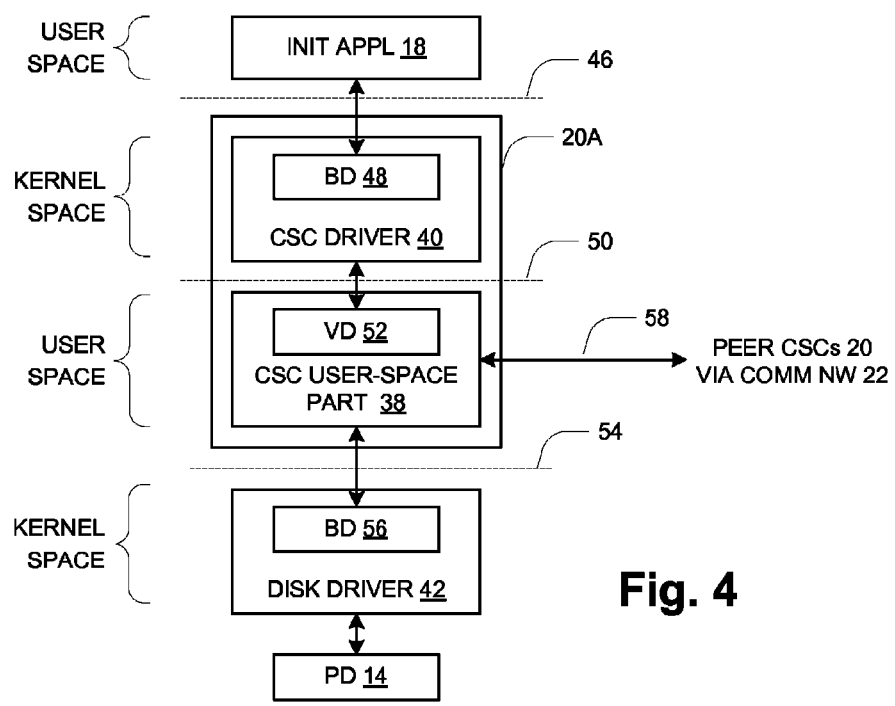

FIGS. 3 and 4 illustrate a first configuration of software in a host 12. Various components are shown as executing either in user space 34 or kernel (system) space 36. In particular, the initiator applications 18 execute in the user space 34. The host-based CSC application 20 of FIG. 1 is divided into a CSC user-space part 38 executing in user space 34 and a CSC driver 40 executing in kernel space 36. The CSC user-space part 38 interfaces to a disk driver 42 and a communications driver 44 both in kernel space 36. The disk driver 42 provides low-level control and data transfer to/from physical storage devices 14 via the local SAN 16. The communications driver 44 provides low-level messaging and data transfer to/from other host computers 12 (specifically "peer" CSC user-space parts 38 in other host computers 12) via the communications network 22.

FIG. 4 shows an alternative view of the structure of FIG. 3 which emphasizes the flow of commands and data. The CSC application is indicated at 20A. Data operations are initiated by an initiator application 18 performing storage I/O operations to the CSC driver 40 at a driver interface 46. The target of the storage I/O operations is a "block device" (BD) 48, which is a virtual block-oriented storage device presented to the initiator application 18 by the CSC application 20A (and specifically by the CSC driver 40). The CSC driver 40 in turn communicates with the CSC user-space part 38 at an interface 50, with commands being directed to a virtual device (VD) 52. The CSC user-space part 38 in turn communicates with the disk driver 42 at an interface 54 with commands being directed to a block device 56. The CSC user-space part 38 also has a connection 58 to peer CSC applications 20 of other hosts 12 via the communications network 22. The connection 58 includes functionality of the communications driver 44, which is omitted from FIG. 4 for clarity. Finally, the disk driver 42 performs operations directed to a local physical storage device 14 (i.e., accessible via the local SAN 16).

The structure of FIGS. 3 and 4 may provide certain advantages that can be helpful in certain applications. By placing the CSC user-space part 38 in user space 34, any instability or other undesirable behavior of the CSC user-space part 38 can be effectively insulated from more critical portions of the software of the host 12 (such as the operating system). Thus, the structure may lend itself to development and testing environments, for example, when insulation of this type is desirable. If the CSC user-space part 38 becomes unstable during operation, its execution can more easily be modified or terminated without affecting the operation of other parts of the hosts 12.

Figure 5:
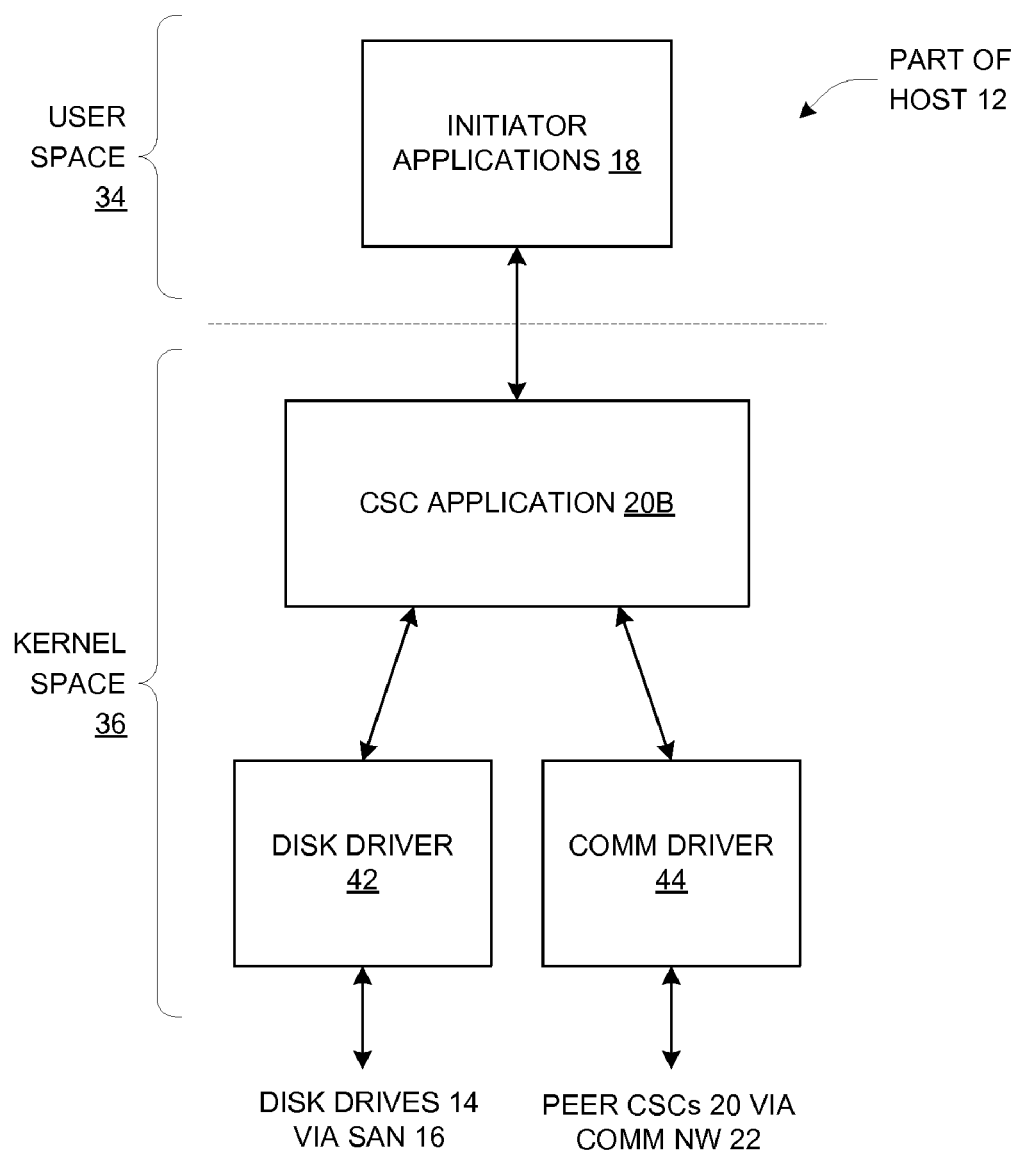
FIGS. 5 and 6 are schematic diagrams showing a structure of software of a host computer according to a second configuration.
Figure 6:
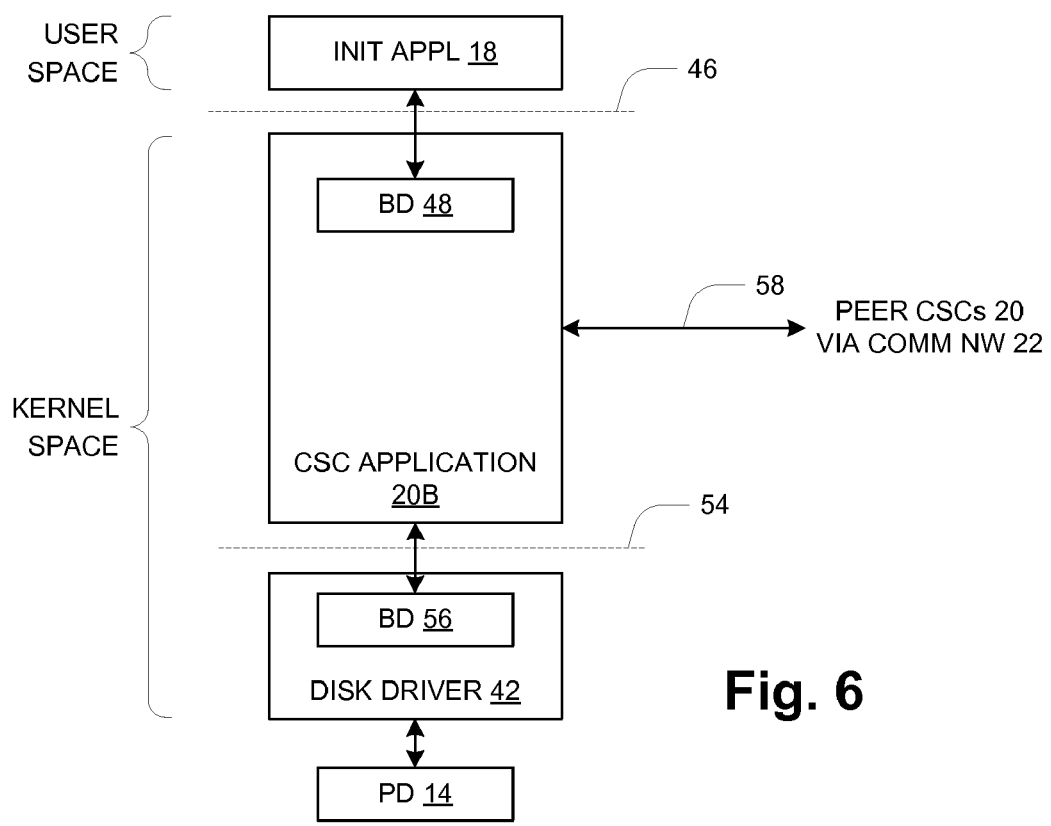

FIGS. 5 and 6 show a second configuration of software in a host 12, illustrated in a parallel manner to FIGS. 3 and 4 respectively. The main difference is the use of a CSC application 20B which resides entirely within the kernel space 36. The overall functioning of the CSC application 20B from the perspective of its external interfaces 46, 54 and 58 (FIG. 6) may be generally the same as that of the CSC application 20A of FIGS. 3-4. As evident in FIG. 6, this alternative structure has fewer interfaces and thus has the benefit of somewhat greater simplicity. Because this structure places the CSC application 20B entirely in kernel space 36, it generally lacks the insulating quality of the structure of FIGS. 3 and 4 as discussed above. Thus it will generally be preferable that the CSC application 20B has a relatively mature and stable nature, to avoid undesirable disruptions to overall operation of the hosts 12.

The distributed processing system as described herein may be used in a variety of manners. One key application is seen to be in support of distributed file systems. The hosts 12 may execute respective distributed file system (DFS) applications among the initiator applications 18, with the DFS applications all utilizing a shared set of block devices provided by the CSC applications 20 as described herein. The DFS application executing at a given host 12 can treat each block device as a local block device and leave most of the underlying details of the actual data distribution to the CSC applications 20. Here again this may be particularly advantageous in a process of developing a DFS or a DFS-dependent application.

It is noted that the disclosed technique can provide certain specific advantages as outlined below:

1. Usage of resources local to a host 12, most notably storage 28 internal to a host, which is generally not possible when separate, standalone storage controllers are used. By having the CSC application run inside the host which contains its own disk(s), several features such as cloning, PIT copy, slicing, striping, mirroring etc. can use the internal storage 28 available within a host 12.
2. By enabling encryption and/or compression in the host-based CSC application 20, user data will be encrypted and/or compressed at the block level before it hits any external wires. For encryption, this means extra security—no unsecured data leaves the host 12. For compression, this means bandwidth savings on the SAN 16. Additionally, using a host-based CSC application 20 also provides for the following:
   a) Cost savings in multiple dimensions:
      power consumption
      space utilization
      cooling capacity
   b) More efficient setup/configuration/administration of storage (for example: fewer authentication domains)
   c) Lower latency (delay) for operations, because fewer networks are traversed and there is greater proximity of the storage controller to the host application. As examples:
      I/O operations: no store-and-forward is required as it is for an external storage controller
      Configuration operations: each configuration operation only has to go as far as the local storage controller (and potentially other host-based storage controllers) as opposed to one or more external storage controller(s).
   d) More precise and dynamic control of resource utilization. For example: in the case of an external storage controller, its resources are dedicated to storage controller activities. In a virtualized storage controller case, the resources it makes use of can be reallocated to other tasks on the same host, on demand.

While various embodiments of the invention have been particularly shown and described, it will be understood by those skilled in the art that various changes in form and details may be made therein without departing from the spirit and scope of the invention as defined by the appended claims.

What is claimed is:
1. A host computer for use in a data processing system distributed across a plurality of locations coupled together by a wide-area communications network, the data processing system including a set of physical storage devices and a set of host computers distributed across the locations, the host computer being one of the set of host computers and comprising:

processing circuitry including a processor, memory, storage and interface circuitry coupled together by interconnection circuitry; and a local initiator application and a local caching storage controller (CSC) application stored and executed by the processing circuitry, the local initiator application being one of a set of initiator applications distributed across the host computers, the local CSC application being co-operative with other CSC applications distributed across the host computers to:

(1) define a set of block devices presented to the initiator applications for block-oriented data storage operations, the block devices being virtual devices utilizing the set of physical storage devices for underlying physical data storage, (2) engage in a distributed cache coherence protocol to present the block devices consistently to the initiator applications, (3) in response to a local block storage read command from an initiator application, retrieve user data from either a cache of the CSC application, a cache of a remote CSC application, or a physical storage device, and (4) in response to a local block storage write command from an initiator application, invalidate all currently cached user data for locations/addresses associated with the write command, and either store the user data associated with the write in a cache of one or more local or remote CSC applications or write the user data to one or more local or remote physical storage devices.

2. A host computer according to claim 1, wherein the CSC application includes a CSC user-space part executing from a user space of the host computer and a CSC driver stored and executed by the processing circuitry, the CSC driver executing from a kernel space of the host computer and being operative to translate the block-oriented data storage operations directed to the block device into corresponding lower-level operations directed to a corresponding virtual device of the CSC user-space part which maps to the underlying physical storage devices.

3. A host computer according to claim 2, wherein the host computer further includes a disk driver and a communications driver stored and executed by the processing circuitry from the kernel space, the disk driver providing low-level control and data transfer with the physical storage devices at the location of the host computer, the communications driver providing low-level control and data transfer with the communications network to effect communications with the other CSC applications.

4. A host computer according to claim 1, wherein the CSC application executes from a kernel space of the host computer and is operative to (1) directly receive the local block storage commands from the initiator applications of the host computer, and (2) perform the block-oriented data storage operations directed to the block device without involvement of any intermediate virtual devices.

5. A host computer according to claim 1, further including a distributed file system (DFS) application stored and executed by the processing circuitry, the DFS application being one of the initiator applications and utilizing the block devices to provide underlying storage for a distributed file system defined across and shared by the host computers.

6. A host computer according to claim 1, wherein:

the block devices defined by the CSC applications include a RAID volume using at least two underlying physical storage devices at different locations;

the local block storage command is directed to the RAID volume;

the outgoing block storage request is directed to a remote one of the two underlying physical storage devices of the RAID volume; and the CSC application is further operative in response to the local block storage command to also perform a corresponding block storage operation on a local one of the two underlying physical storage devices of the RAID volume.

7. A host computer according to claim 1, wherein the set of physical storage devices which provide the underlying physical data storage includes the storage in the host computer.

8. A host computer according to claim 7, wherein the CSC application is further operative to provide a high-level function using both the storage in the host computer as well as a remote one of the physical storage devices reachable via another host computer.

9. A host computer according to claim 1, wherein the CSC application is further operative to:

perform encryption of the user data associated with the write command and forward encrypted user data to the remote CSC applications or remote physical storage devices; and perform decryption of the user data for the local block storage read command.

10. A host computer according to claim 1, wherein the CSC application is further operative to:

perform compression of the user data associated with the write command and forward compressed user data to the remote CSC applications or remote physical storage devices; and perform decompression of the user data for the local block storage read command.

11. A method of operating a host computer in a data processing system distributed across a plurality of locations coupled together by a wide-area communications network, the data processing system including a set of physical storage devices and a set of host computers distributed across the locations, the host computer being one of the set of host computers, the method comprising the steps, performed by processing circuitry of the computer, of:

executing a local initiator application and a local caching storage controller (CSC) application, the local initiator application being one of a set of initiator applications distributed across the host computers, the local CSC application being co-operative with other CSC applications distributed across the host computers; and as part of executing the local CSC application co-operatively with the other CSC applications:

defining a set of block devices presented to the initiator applications for block-oriented data storage operations, the block devices being virtual devices utilizing the set of physical storage devices for underlying physical data storage, engaging in a distributed cache coherence protocol to present the block devices consistently to the initiator applications, in response to a local block storage read command from an initiator application, retrieving requested data from either a cache of the CSC application, a cache of a remote CSC application, or a physical storage device, and in response to a local block storage write command from an initiator application, invalidating all currently cached user data for locations/addresses associated with the write command, and either storing the user data associated with the write in a cache of one or more local or remote CSC applications or writing the user data to one or more local or remote physical storage devices.

12. A method according to claim 11, wherein the CSC application includes a CSC user-space part executing from a user space of the host computer and a CSC driver stored and executed by the processing circuitry, the CSC driver executing from a kernel space of the host computer and being operative to translate the block-oriented data storage operations directed to the block device into corresponding lower-level operations directed to a corresponding virtual device of the CSC user-space part which maps to the underlying physical storage devices.

13. A method according to claim 12, further comprising executing a disk driver and a communications driver from the kernel space, the disk driver providing low-level control and data transfer with the physical storage devices at the location of the host computer, the communications driver providing low-level control and data transfer with the communications network to effect communications with the other CSC applications.

14. A method according to claim 11, wherein the CSC application executes from a kernel space of the host computer and is operative to (1) directly receive the local block storage commands from the initiator applications of the host computer, and (2) perform the block-oriented data storage operations directed to the block device without involvement of any intermediate virtual devices.

15. A method according to claim 11, further comprising executing a distributed file system (DFS) application, the DFS application being one of the initiator applications and utilizing the block devices to provide underlying storage for a distributed file system defined across and shared by the host computers.

16. A method according to claim 11, wherein:
the block devices defined by the CSC applications include a RAID volume using at least two underlying physical storage devices at different locations;
the local block storage command is directed to the RAID volume;
the outgoing block storage request is directed to a remote one of the two underlying physical storage devices of the RAID volume; and
the CSC application is further operative in response to the local block storage command to also perform a corresponding block storage operation on a local one of the two underlying physical storage devices of the RAID volume.

17. A method according to claim 11, wherein the set of physical storage devices which provide the underlying physical data storage includes the storage in the host computer.

18. A method according to claim 17, wherein the CSC application is further operative to provide a high-level function using the storage in the host computer as well as a remote one of the physical storage devices reachable via another host computer.

19. A method according to claim 11, wherein the CSC application is further operative to:
perform encryption of the user data associated with the write command and forward encrypted user data to the remote CSC applications or remote physical storage devices; and
perform decryption of the user data for the local block storage read command.

20. A method according to claim 11, wherein the CSC application is further operative to:
perform compression of the user data associated with the write command and forward compressed user data to the remote CSC applications or remote physical storage devices; and
perform decompression of the user data for the local block storage read command.

* * * * *